(12) United States Patent
Kuhara et al.

(10) Patent No.: US 6,894,770 B2
(45) Date of Patent: May 17, 2005

(54) INSPECTION APPARATUS FOR OPTICAL TRANSMISSION DEVICE

(75) Inventors: Yoshiki Kuhara, Osaka (JP); Yutaka Kakuno, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 60 days.

(21) Appl. No.: 10/400,248

(22) Filed: Mar. 27, 2003

(65) Prior Publication Data

US 2003/0189698 A1 Oct. 9, 2003

(30) Foreign Application Priority Data

Apr. 3, 2002 (JP) ........................................ 2002-101779

(51) Int. Cl.$^7$ ............................................. G01N 21/00
(52) U.S. Cl. ..................................................... 356/73.1
(58) Field of Search .................... 356/73.1, 365, 356/477; 385/123–126, 14–27, 100; 250/227.14–227.18, 227.23, 225; 398/140–172

(56) References Cited

U.S. PATENT DOCUMENTS 5,189,483 A * 2/1993 Inagaki ...................... 356/73.1
5,841,562 A   11/1998 Rangwala et al.
6,654,104 B2 * 11/2003 Kimura et al. ............. 356/73.1

* cited by examiner

*Primary Examiner*—Tu T. Nguyen
(74) *Attorney, Agent, or Firm*—Fish & Richardson P.C.

(57) ABSTRACT

An inspection apparatus for an optical transmission device selects an optical path in accordance with the wavelength of an optical signal transmitted from the optical transmission device and displays an indication of the wavelength of the selected optical signal according to an electrical signal. Thus, an optical transmission device used for single-optical-fiber bidirectional transmission easily can be checked as to whether it is provided for a subscriber or for a central station using different wavelengths.

7 Claims, 7 Drawing Sheets

FIG. 6 (A)  PRIOR ART
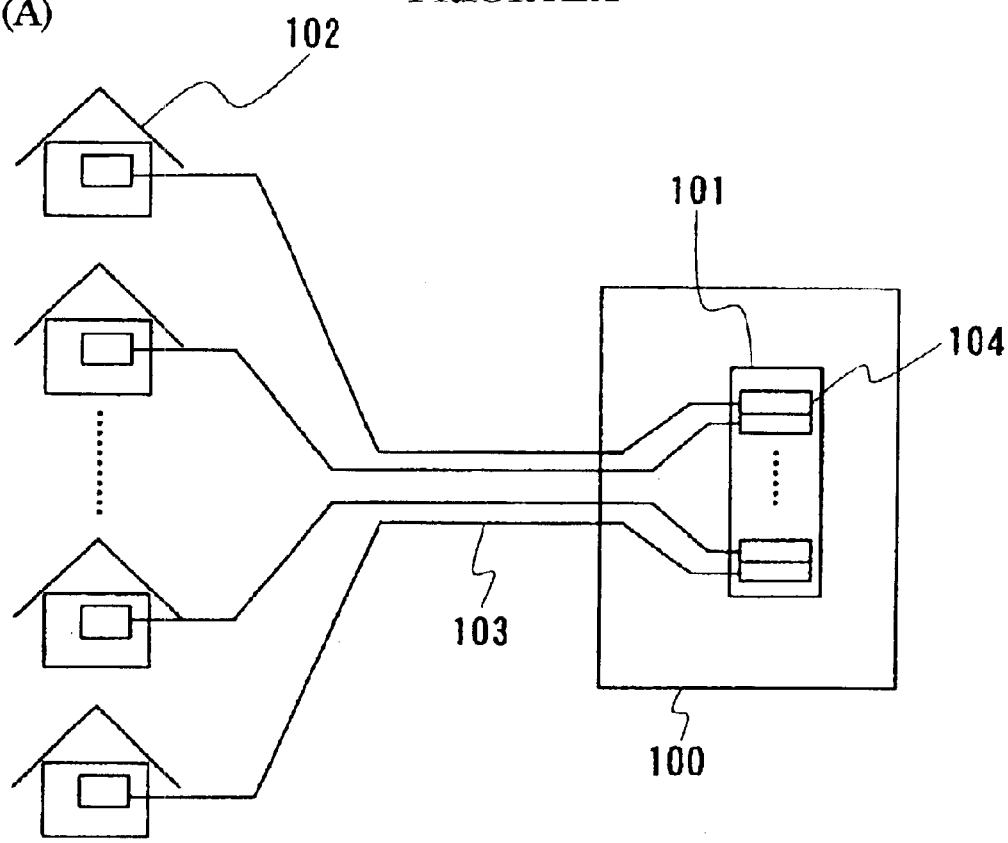
FIG. 6 (B)  PRIOR ART
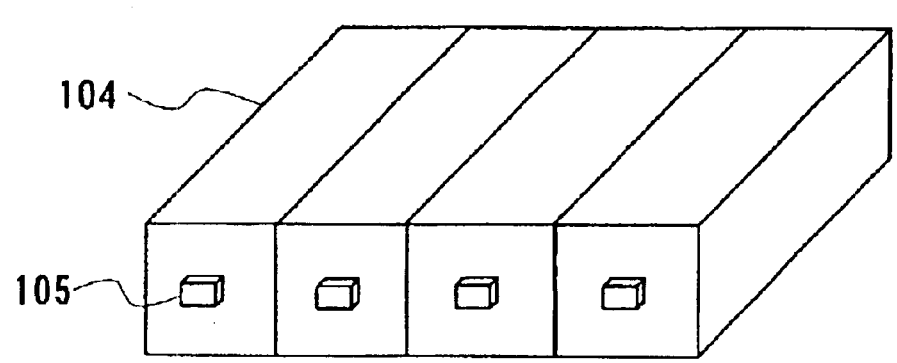

INSPECTION APPARATUS FOR OPTICAL TRANSMISSION DEVICE

BACKGROUND OF THE INVENTION

1. Field of the Invention

The present invention relates to inspection apparatuses for optical transmission device used in optical communication. More particularly, the present invention relates to an inspection apparatus suitable for easy inspection of a specific wavelength in optical transmission device used in a communication system employing a plurality of wavelengths.

2. Description of the Related Art

In order to effectively utilize optical fiber, simultaneous and bidirectional transmission has been made between each subscriber and a central station with a single optical fiber. FIG. 6(A) is a schematic view showing an example of a known optical communication system. This system is generally used when a plurality of optical fibers each perform bidirectional transmission, and is an optical fiber network in which optical fiber cable 103 are led from an optical transmission apparatus 101, such as an optical transmission module, in a central station 100 to subscribers 102. The optical transmission apparatus 101 is an assembly of multiple optical transmission devices 104, as shown in FIG. 6(B), and each subscriber 102 also has an optical transmission device (not shown). That is, each subscriber 102 and the central station 100 are connected by the optical fiber cable 103 through their respective optical transmission devices.

FIG. 7 shows an example of an optical transmission device that performs single-optical-fiber bidirectional transmission. In this optical transmission device 104, a light-emitting device 111 or a light-receiving device 112 is optically coupled to each fiber of an optical multi-fiber cable 103 through a PC-type or SC-type connector 105. More specifically, an optical fiber 110 connected to the connector 105, a lens 113, a wavelength selective filter 114, a lens 115, and the light-emitting device 111, such as a laser diode (LD), are arranged coaxially. The light-receiving device 112, such as a photodiode (PD), is placed perpendicular to the axis of the optical fiber 110 with a lens 116 therebetween. The wavelength selective filer 114 has a function of separating a transmission signal and a receiving signal.

The optical fiber cable 103 is led to the optical transmission device 104 and is divided into individual fibers, which are connected through the connectors 105 to the corresponding optical transmission devices 104 arranged in parallel in the horizontal direction, as shown in FIG. 6(B).

In general, an optical transmission device performs transmission and receiving using two types of light having different wavelengths, and the wavelengths used for the subscribers and the central station are different. More specifically, the optical transmission device on the subscriber side transmits light having a wavelength of 1.3 $\mu$m and receives light having a wavelength of 1.55 $\mu$m, and conversely, that of the central station transmits light having a wavelength of 1.55 $\mu$m and receives light having a wavelength of 1.3 $\mu$m, for example.

Such an optical transmission device can be used for both the subscriber and the central station by exchanging a wavelength selective filter and an LD chip. Therefore, component sharing, reduced production cost, and high economical efficiency can be achieved. Moreover, this system is extremely economical because simultaneous and bidirectional transmission can be accomplished with a single optical fiber.

In the above-related art, however, a simple visual assessment of whether the optical transmission device is provided for the subscriber or for the central station is impossible.

As described above, the optical transmission devices for the subscriber and the central station share most components except for a wavelength selective filter, an LD chip, and the like provided inside the casing. Moreover, since the single optical fiber is used, there is no difference in outer shape between the optical transmission devices. Accordingly, it is difficult to discriminate between the optical transmission devices by appearances. Conventionally, the optical transmission devices can be discriminated only by the type identifier printed on the surface of the casing.

Therefore, if an optical transmission device for a subscriber and an optical transmission device for a central station are inadvertently interchanged, that is, for example, if an optical transmission device for a subscriber is installed in the central station, it is difficult to check which optical transmission device is placed in the wrong position. In this case, it is time consuming to construct the system, work efficiency is reduced, and the cost is increased.

The above-described drawback has promoted a demand to achieve an inspection apparatus that can easily discriminate between an optical transmission device for a subscriber and an optical transmission device for a central station when laying a communication system that is capable of simultaneous and bidirectional transmission with a single optical fiber.

SUMMARY OF THE INVENTION

Accordingly, it is a primary object of the present invention to provide an inspection apparatus that can easily identify an optical transmission device as to whether the optical transmission device used in single-optical-fiber bidirectional transmission is provided for a subscriber or for a central station.

The above object is achieved by selecting a specific wavelength from optical signals transmitted from an optical transmission device and displaying the wavelength.

According to one aspect of the present invention, an inspection apparatus for an optical-transmission device comprises a coupling means to be optically coupled to the optical transmission device, a selecting means for optically separating and selecting an optical signal of a specific wavelength out of a plurality of optical signals having different wavelengths transmitted from the optical transmission device, a converting means for converting the selected optical signal into an electrical signal, and a displaying means for displaying the selected wavelength according to the electrical signal.

In this inspection apparatus of the present invention, a simple check of the wavelength of a transmission signal from the optical transmission device can be done visually by selecting only a signal with a specific wavelength from a plurality of signals having different wavelengths transmitted from the optical transmission device and by displaying the selected wavelength. That is, by separately assigning specific wavelengths of transmission signals from the optical transmission device to the subscriber and the central station, it is possible to easily check, on the basis of the wavelength detected by the inspection apparatus, whether the optical transmission device is provided for the subscriber or for the central station. Therefore, when a communication system that performs simultaneous and bidirectional transmission is laid, it is possible to easily check whether an optical transmission device is provided for the subscriber or for the central station, and thereby to reduce the possibility of placing an optical transmission device for the subscriber and an optical transmission device for the central station in the wrong position.

The present invention will be described in more detail below.

An optical transmission device to be inspected by the inspection apparatus of the present invention generally has a connector. Therefore, in the present invention, it is preferable that the coupling means be an optical fiber connector that can be simply coupled to an optical transmission device having a connector.

Preferably, the converting means is a light-receiving device (photodiode (PD)). In order to check a plurality of wavelengths, while a plurality of light-receiving devices, each having one light-receiving portion, may be provided, it is more preferable to provide a light-receiving device having a plurality of light-receiving portions. In the latter case, a plurality of wavelengths can be detected by a single light-receiving device, and the size of the inspection apparatus can be reduced further.

Preferably, the displaying means is a light-emitting device, such as a light-emitting diode (LED), that can convert a converted electrical signal into visible light. One displaying means may be provided to display corresponding to a specific wavelength, or two or more displaying means may be provided to display corresponding to a plurality of wavelengths. Furthermore, at least one of a driving IC for the light-emitting device and a signal amplifier for the light-receiving device may be provided.

While the selecting means may be a combination of a wavelength branching filter and a mirror, more preferably, it may be a multilayer filter, such as a wavelength division multiplexing (WDM) filter, in order to reduce the size of the inspection apparatus. Alternatively, the selecting means may be a Mach-Zehnder interferometer formed in a part of an optical waveguide. This is preferable because the inspection apparatus can be integrated. The Mach-Zehnder interferometer can separate wavelengths by the distance between optical waveguides and the length of a parallel portion of the optical waveguides. The distance between the optical waveguides and the length of the parallel portion may be appropriately determined in accordance with the wavelength to be checked. A platform on which the optical waveguides are formed may be an Si substrate. The Si substrate can be subjected to high-precision processing of the order of $\mu$m by photolithography and etching, and optical waveguides can be easily and precisely formed thereon. The optical waveguides include a $SiO_2/GeO_2$ optical waveguide or a polymer optical waveguide. The $SiO_2/GeO_2$ optical waveguide includes various types in which $SiO_2$ and $GeO_2$ serving as components are mixed at different ratios. The polymer optical waveguide is made of polyimide or fluorinated polyimide.

The size of the inspection apparatus can be further reduced by using the light-receiving device having a plurality of light-receiving portions, and multilayer filters. It can, for example, be reduced to a size substantially equal to the size of an optical transmission device (data link) to be inspected. Accordingly, the inspection apparatus of the present invention is easily portable and highly mobile, and can be used easily at a system construction site.

While the wavelengths to be checked may be appropriately determined, two wavelengths, one of 1.3 $\mu$m band and one of 1.6 $\mu$m band, are preferably used because they are most frequently used by an optical subscriber system. It is desirable to set the wavelengths to be checked in the range from 1.3 $\mu$m to 1.6 $\mu$m, so that the inspection apparatus is applicable to coarse wavelength division multiplexing (CWDM) and dense wavelength division multiplexing (DWDM).

Preferably, the inspection apparatus is covered with a casing for mechanical protection.

As described above, the inspection apparatus of the present invention provides a great advantage of simple checking of the wavelength of a transmission signal from the optical transmission device. Accordingly, it is possible to easily check at a system construction site whether an optical transmission device is provided for a subscriber or for a central station, and thus prevent arrangement error. In particular, by using a PD having a plurality of light-receiving portions or a Mach-Zehnder interferometer, the size of the inspection apparatus can be further reduced, mobility can be enhanced, and cost can be reduced.

Further objects, features, and advantages of the present invention will become apparent from the following description of the preferred embodiments with reference to the attached drawings.

BRIEF DESCRIPTION OF THE DRAWINGS

FIG. 6(A) is a schematic view showing an example of a known optical communication system, and FIG. 6(B) is a schematic view of an optical transmission device.

DESCRIPTION OF THE PREFERRED EMBODIMENTS

Figure 1:
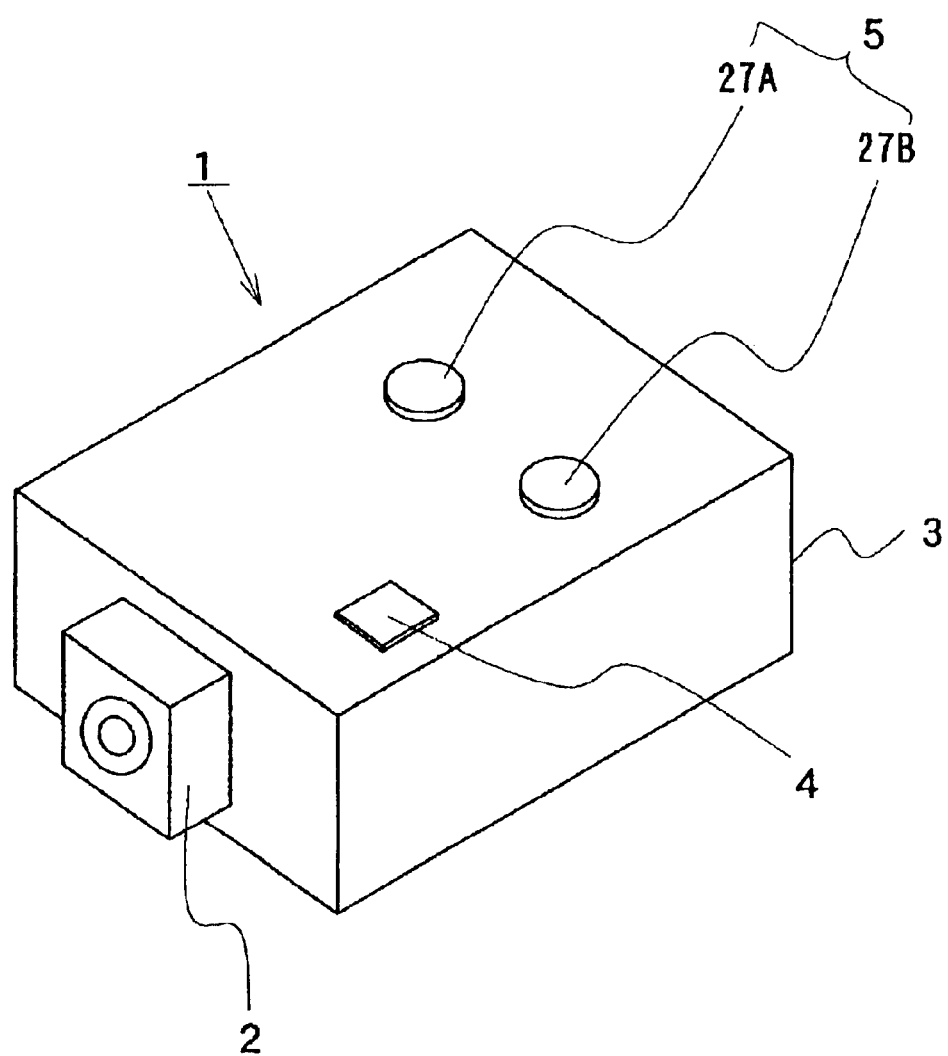
FIG. 1 is a schematic external view of an inspection apparatus according to the present invention.

Embodiments of the present invention will be described below with reference to the attached drawings. The same components are denoted by the same reference numerals in the drawings, and redundant descriptions thereof are omitted. The scales in the drawings are not necessarily equal to those in the description.

First Embodiment

FIG. 1 is a schematic external view of an inspection apparatus for optical transmission device according to a first embodiment of the present invention. An inspection apparatus 1 has, in a casing 3, an optical system serving as a selecting means for selecting the wavelength of a transmission signal from an optical transmission device (not shown), and an electrical circuit serving as a converting means for converting light having the selected wavelength into an electrical signal. At an end of the casing 3, an optical connector 2 is provided as an optical coupling means for optical coupling to the optical transmission device. In this embodiment, the inspection apparatus 1 also includes a battery (not shown) provided as a power source in the casing 3, an ON/OFF switch 4 provided on the surface of the casing 3, and a display section 5 including LEDs 27A and 27B that emit light in response to an electrical signal.

Figure 2:
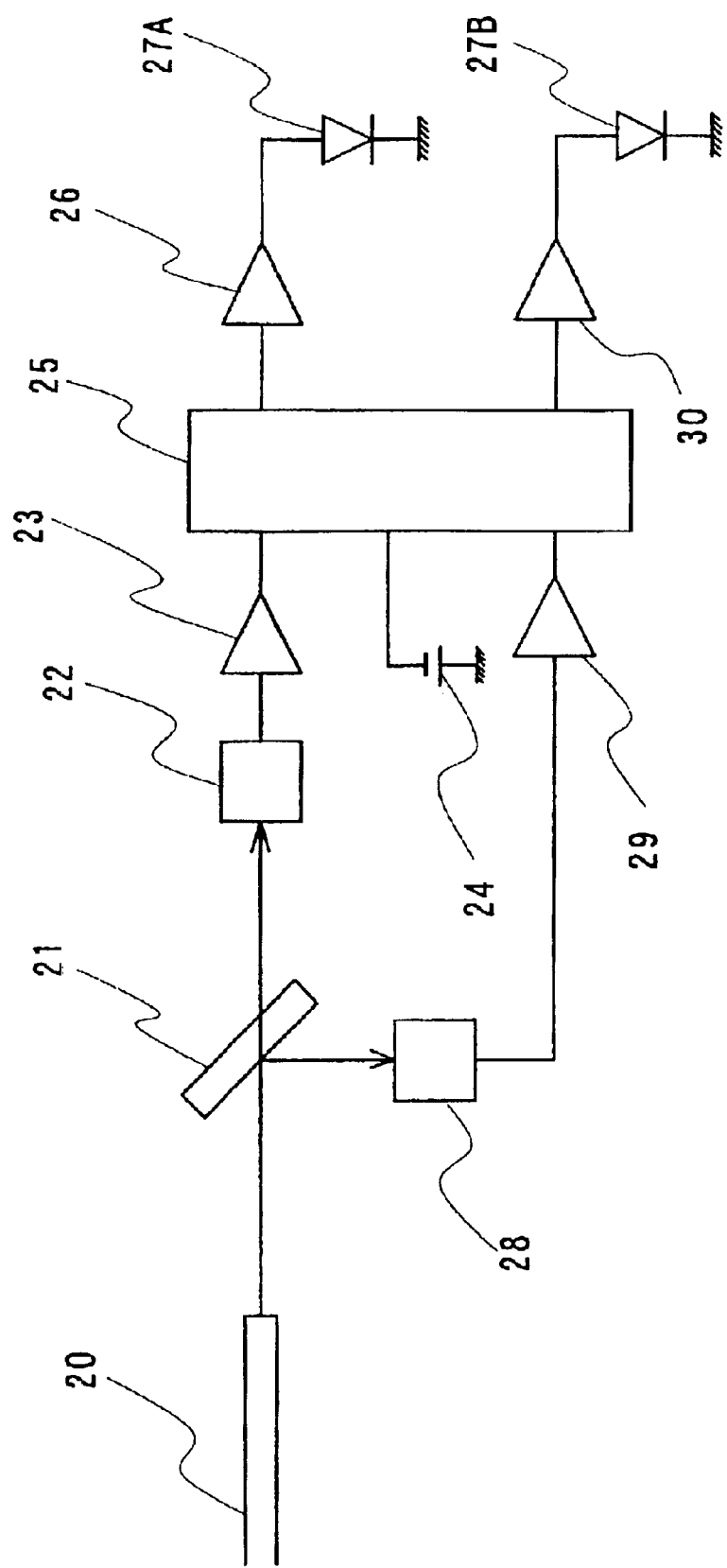
FIG. 2 is an explanatory view of an optical system and an electrical circuit contained in a casing of the inspection apparatus.

FIG. 2 shows the optical system and the electrical circuit contained in the casing 3 of the inspection apparatus 1. A dielectric multilayer filter 21, such as a wavelength division multiplexing filter, a PD 22 made of InGaAs, a preamplifier (signal amplifier) 23, a comparator 25 connected to a reference voltage 24, a driving IC 26, and an LED 27A are arranged coaxially with an optical fiber 20 provided in the optical connector 2. A PD 28 is disposed perpendicular to the axis of the optical fiber 20, and a preamplifier 29, the comparator 25, a driving IC 30, and an LED 27B are provided in the enumerated order.

For example, in order to check whether light has a wavelength of 1.3 μm or a wavelength of 1.55 μm in such an optical system, only light with one of the wavelengths passes through a filter 21 and is received by the PD 22, and light with the other wavelength is reflected by the filter 21 and is received by the PD 28. Electrical signals from the PDs 22 and 28 are amplified by the preamplifiers 23 and 29, respectively, and are directed to the comparator 25 such that the LED 27A or 27B which corresponds to the wavelength on the higher output level side is caused to emit light.

In this embodiment, the reference voltage is provided because, by changing the reference voltage, the wavelength of light can be checked to determine whether it is equal to the wavelength to be detected. The intensity of light having the wavelength to be detected can also be checked to determine its normality to meet a predetermined standard. That is, even when there is a noise level, it is possible to ascertain whether the output from each amplifier exceeds the noise level.

In the inspection apparatus 1 having this optical system and electrical circuit, when an optical transmission device to be inspected is connected to the connector 2 shown in FIG. 1 and the switch 4 is turned on, the LED 27A or 28A operates to emit light, depending on the wavelength of a signal transmitted from the optical transmission device. Therefore, on the basis of the operating LED, the inspecting operator can recognize the wavelength of the light transmitted from the optical transmission device.

Second Embodiment

Figure 3:
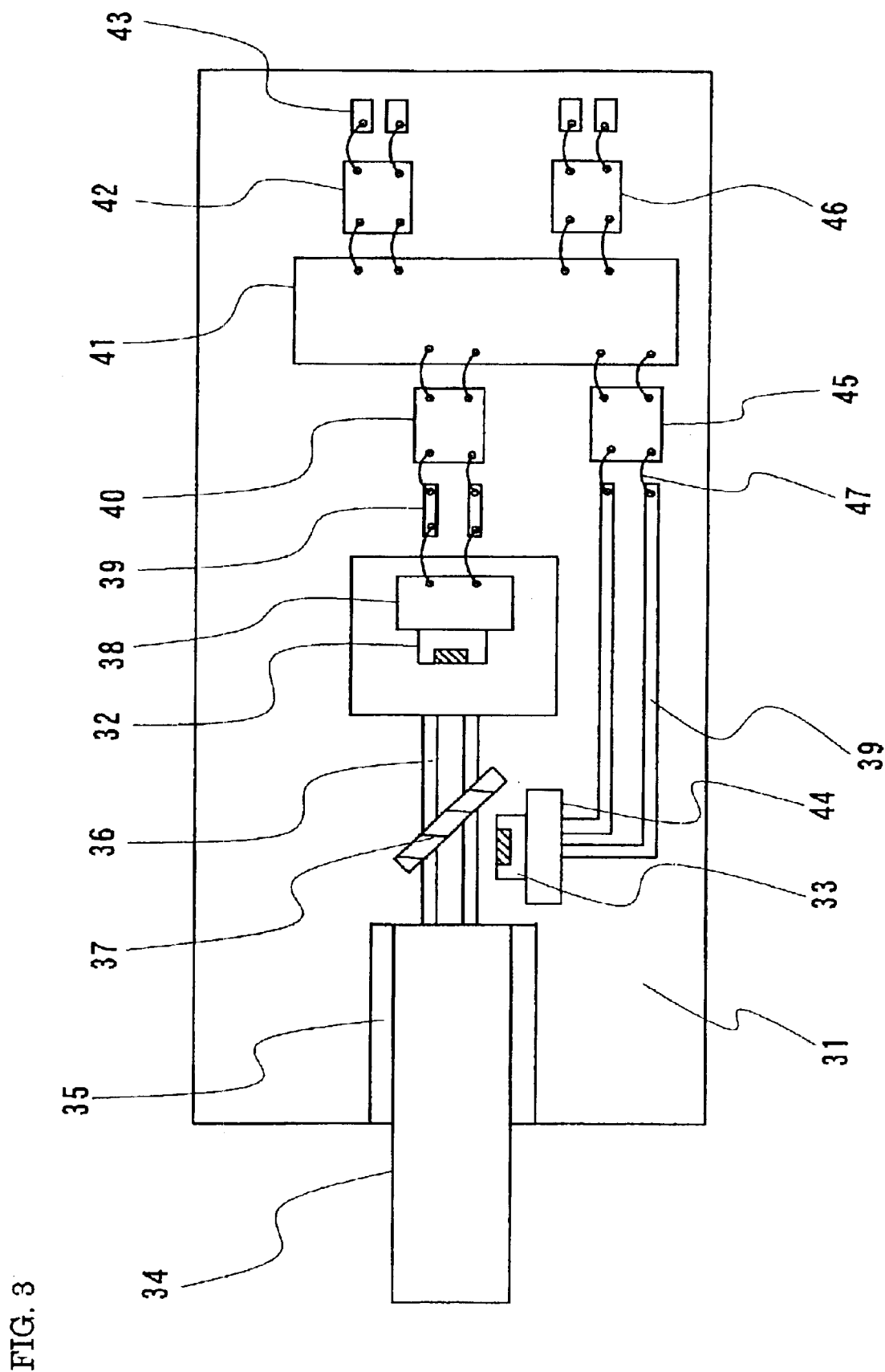
FIG. 3 is a schematic view showing an optical system and an electrical circuit arranged on a ceramic substrate.

A description will now be given of a second embodiment in which an optical system and an electrical circuit are arranged on a ceramic substrate. FIG. 3 is a schematic view showing the arrangement of the optical system and the electrical circuit on the ceramic substrate. As shown in FIG. 3, PDs 32 and 33 are provided, in a manner similar to that in the first embodiment, on a ceramic substrate 31, which is made of $Al_2O_3$, for example.

More specifically, a ferrule V-groove 35 in which a ferrule 34 is placed is formed at an end of the ceramic substrate 31, and a V-groove 36 through which light from an optical fiber (not shown) provided in the ferrule 34 passes is formed in parallel with the axis of the optical fiber. A dielectric multilayer filter 37 is placed on the V-groove 36. In the second embodiment, the dielectric multilayer filter 37 is placed at an angle of approximately 45° to the axis of the optical fiber. The PD 32, a submount 38, wiring patterns 39 on the substrate 31, a preamplifier 40, a comparator 41, and a driving IC 42 are arranged in a direction parallel with the axis of the optical fiber. The driving IC 42 is connected to an LED provided on the upper side of the substrate 31 through pads 43. A PD 33 and a submount 44 are disposed in a direction perpendicular to the axis of the optical fiber, and wiring patterns 39, a preamplifier 45, the comparator 41, and a driving IC 46 are arranged in the enumerated order, and the driving IC 46 is similarly connected through pads 43 to an LED on the upper side of the substrate 31. The devices are connected by bonding wires 47. Preferably, such a substrate 31, together with these devices provided thereon, is entirely resin-molded, and is then placed in a casing, as in the first embodiment, for mechanical protection.

In the second embodiment, since the optical system and the electrical circuit are arranged on the ceramic substrate, reliability can be increased and the size can be reduced. Therefore, low-cost mounting is possible.

Third Embodiment

Figure 4:
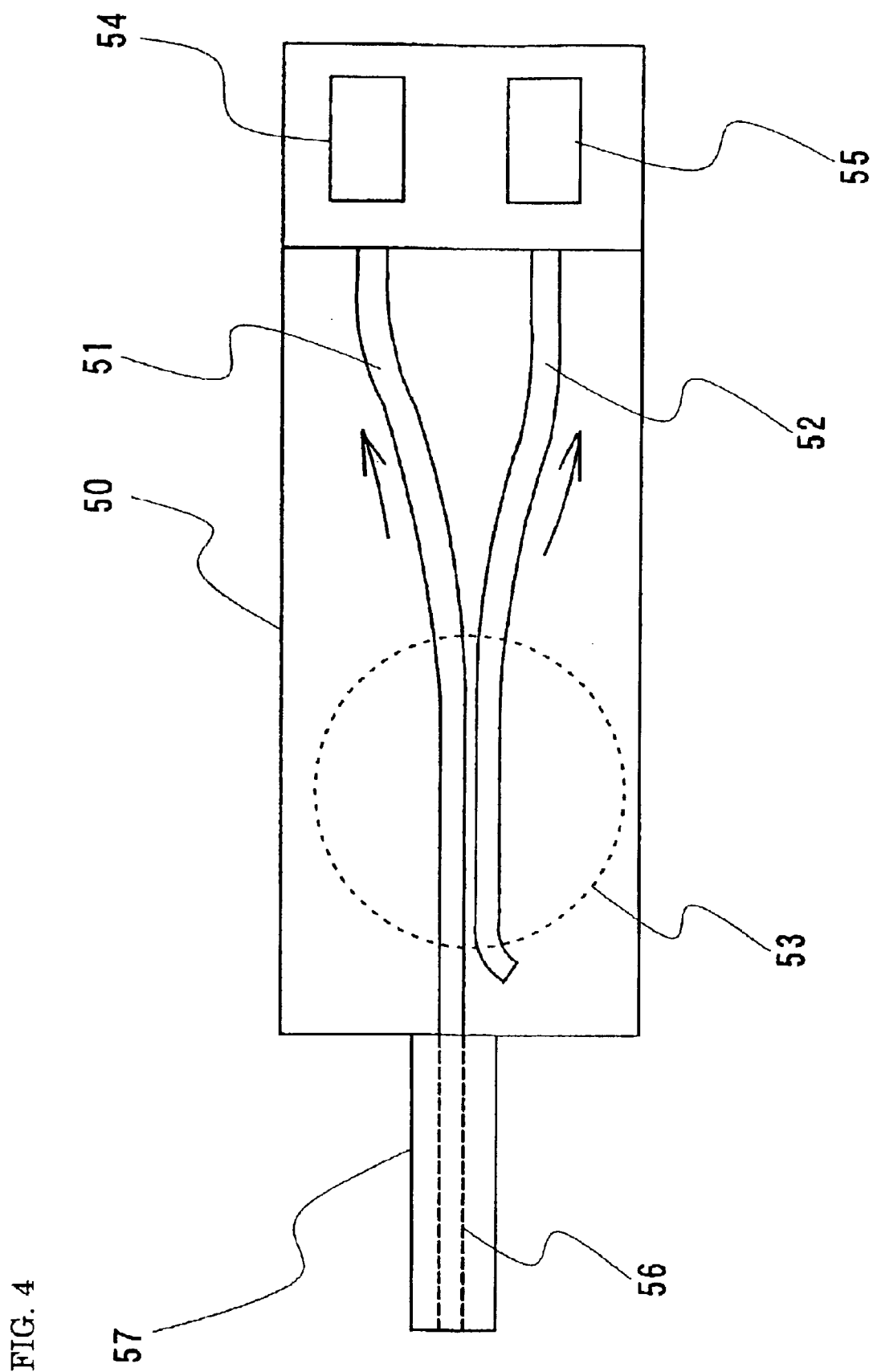
FIG. 4 is a schematic view of an optical system using a Mach-Zehnder interferometer.

A description will be given of a third embodiment of the present invention in which a Mach-Zehnder interferometer is used in an optical system. FIG. 4 is a schematic view of an optical system using a Mach-Zehnder interferometer. A first optical waveguide 51 and a second optical waveguide 52 are formed adjacent to each other on an Si platform 50. The second optical waveguide 52 is a transmission line that is close to the first optical waveguide 51 at one end and is apart therefrom at the other end. Close portions of the first optical waveguide 51 and the second optical waveguide 52 constitute a Mach-Zehnder interferometer 53 (a portion encircled by a broken line in FIG. 4). PDs 54 and 55 are connected to the optical waveguides 51 and 52, respectively. The first optical waveguide 51 serves as a transmission line for light with a wavelength of 1.3 μm, and the second optical waveguide 52 serves as a transmission line for light with a wavelength of 1.55 μm. A ferrule 57 having an optical fiber 56 is provided at an end of the Si platform 50.

Such an Si platform 50 may be mounted on the ceramic substrate in the second embodiment to be combined with the electrical circuit. For easy mounting, it is preferable in this case to use waveguide-type edge-illuminated photodiodes as the photodiodes.

In the above configuration, a transmission signal transmitted through the optical fiber 56 is separated to the first optical waveguide 51 or the second optical waveguide 52 by the Mach-Zehnder interferometer 53 depending on its wavelength, and enters an LED (not shown) through the PD 54 or the PD 55. Consequently, the LED which the signal enters emits light, allowing the wavelength of the transmission light from an optical transmission device to be detected. Such adoption of the waveguide structure can further reduce the size and cost of the optical system.

Fourth Embodiment

Figure 5:
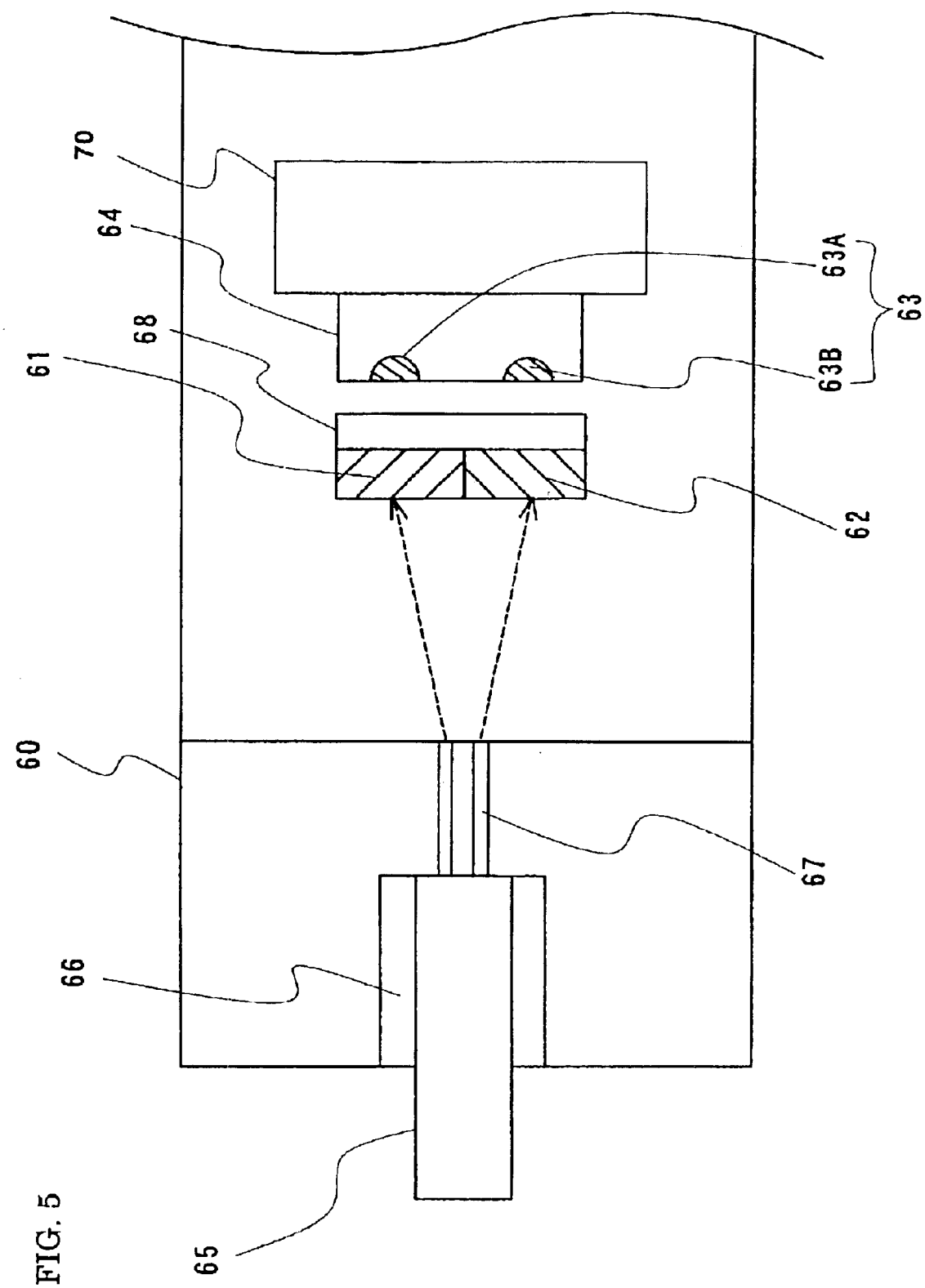
FIG. 5 is a schematic view of an optical system in which a PD having two light-receiving portions in one chip is placed.
Figure 7:
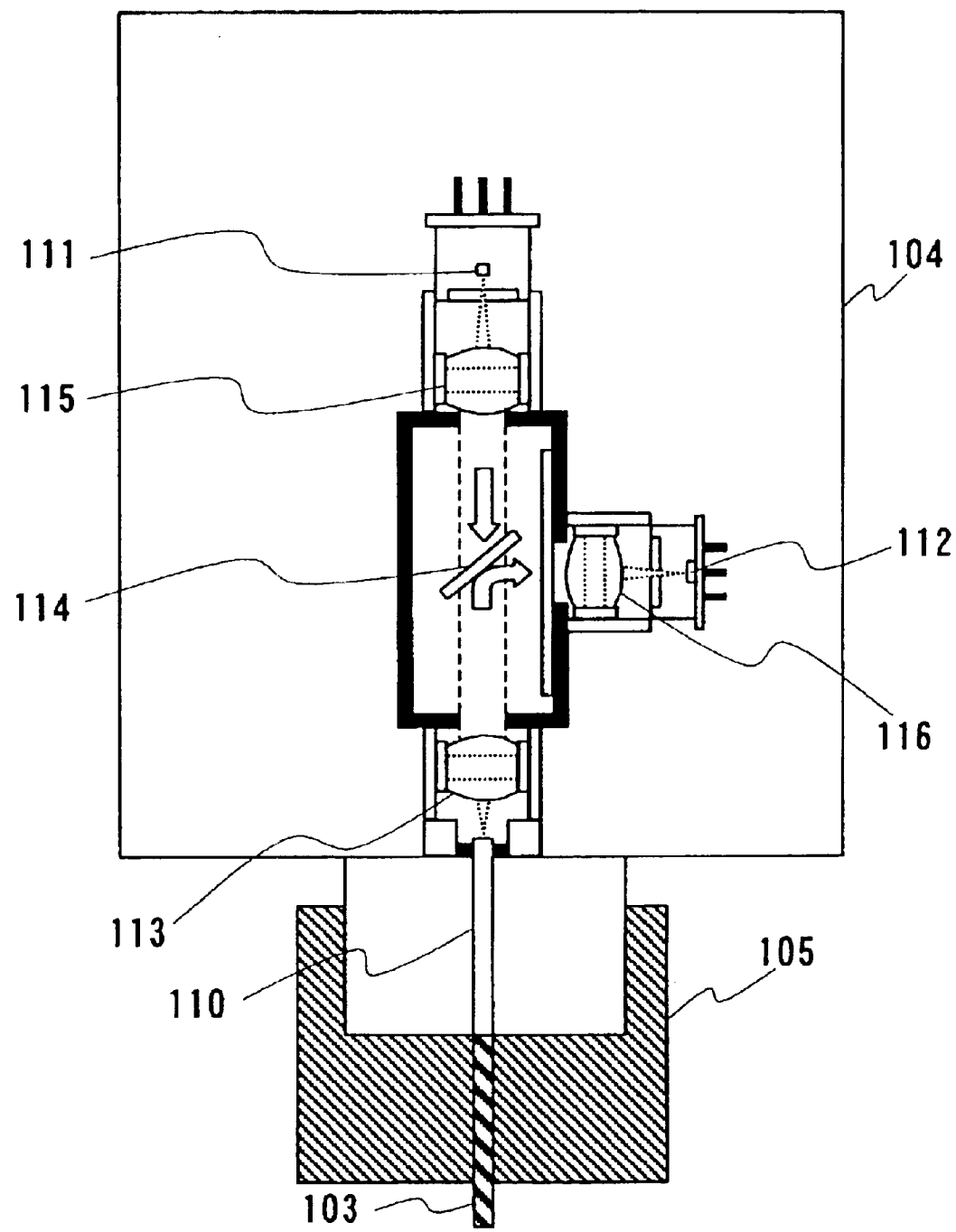
FIG. 7 is a schematic view showing an example of an optical transmission device that performs single-optical-fiber bidirectional transmission.

A description will now be given of a fourth embodiment in which a PD having two light-receiving portions in one chip is used. FIG. 5 is a schematic view of an optical system in which a PD having two light-receiving portions in one chip is placed. In the fourth embodiment, two dielectric multilayer filters 61 and 62, which are different in terms of the wavelength of light that they reflect or allow to pass therethrough, and a PD array 64 having two light-receiving portions 63A and 63B are provided on a ceramic substrate 60.

A ferrule V-groove 66 in which a ferrule 65 is placed is formed at an end of the ceramic substrate 60, and a V-groove 67 is provided in parallel with the axis of an optical fiber in the ferrule 65 so that light from the optical fiber passes therethrough. The dielectric multilayer filters 61 and 62 bonded to a glass substrate 68 are placed at a distance from an end of the V-groove 67 and in front of the PD array 64. A submount 70 is formed in the rear of the PD array 64. For example, the dielectric multilayer filter 61 transmits light having a wavelength of 1.3 μm and reflects light having a wavelength of 1.55 μm. Conversely, the dielectric multilayer filter 62 transmits light having a wavelength of 1.55 μm and reflects light having a wavelength of 1.3 μm In FIG. 5, the upper light-receiving portion 63A and the lower light-receiving portion 63B convert light of 1.3 μm wavelength and light of 1.55 μm wavelength, respectively, into an electrical signal. Light from the optical fiber passes through either of the dielectric multilayer filters 61 and 62, and enters either of the light-receiving portions 63A and 63B of the photodiode array 64, depending on its wavelength. An electrical signal converted by the light-receiving portion 63A or 63B is introduced into an LED (not shown), thereby causing the LED to emit light. As a result, the wavelength of the transmission light from the optical transmission device can be detected by the LED that emits light.

That is, when light sent from the optical fiber has a wavelength of 1.3 μm, it passes through the dielectric multilayer filter 61, and a current runs through the upper light-receiving portion 63A. Conversely, when light from the optical fiber has a wavelength of 1.55 μm, it passes through the dielectric multilayer filter 62, and a current runs through the lower light-receiving portion 63B.

When a plurality of wavelengths are checked in this way, it is preferable that the number of display sections be equal to the number of wavelengths to be checked. In this embodiment, two display sections are provided. Furthermore, by placing the ferrule 65 and the filters 61 and 62 at a distance from each other, light having different wavelengths is spread so that it can pass through a plurality of filters. Therefore, it is preferable to appropriately determine the distance depending on the number of wavelengths to be checked.

By thus using the PD having a plurality of light-receiving portions, the light-receiving section can be further reduced in size. Moreover, a plurality of wavelengths can be checked with one PD chip, the cost of the inspection apparatus can be reduced further. By increasing the number of light-receiving portions of the PD to extend the range of wavelengths to be checked as in this embodiment, it is possible to easily check the wavelengths even in an optical transmission device for a multiwavelength system, such as a DWDM system, using 40 wavelengths, 80 wavelengths, or 120 wavelengths. Preferably, the wavelengths to be checked range from 1.3 μm to 1.6 μm because the range is frequently used by an optical subscriber system.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An inspection apparatus for an optical transmission device comprising:

a coupling means to be optically coupled to the optical transmission device, wherein said coupling means comprises an optical fiber connector;

a selecting means for selecting an optical path from among a plurality of optical paths in accordance with the wavelength of an optical signal transmitted from the optical transmission device;

a converting means for converting the optical signal into an electrical signal, wherein said converting means comprises a photodiode; and a displaying means for displaying an indication of the wavelength of the optical signal according to the electrical signal, wherein said displaying means comprises a light-emitting device.

2. An inspection apparatus for an optical transmission device according to claim 1, wherein said selecting means is a multilayer filter.

3. An inspection apparatus for an optical transmission device according to claim 1, wherein said selecting means is a Mach-Zehnder interferometer formed in a part of an optical waveguide.

4. An inspection apparatus for an optical transmission device according to claim 1, where said displaying means is a light-emitting diode.

5. An inspection apparatus for an optical transmission device according to claim 1, wherein the selecting means selects a first one of the optical paths if the optical signal has a wavelength in the 1.3 μm band and selects a second one of the optical paths if the optical signal has a wavelength in the 1.6 μm band.

6. An inspection apparatus for an optical transmission device according to claim 1, wherein the the selecting means selects a first one of the optical paths if the optical signal has a first wavelength in a range from 1.3 μm to 1.6 μm, and selects a second one of the optical paths if the optical signal has a second wavelength in that range.

7. An inspection apparatus for an optical transmission device comprising:

a coupling means including an optical fiber connector to be optically coupled to an optical transmission device;

a selecting means including a multilayer filter for selecting an optical path from among a plurality of optical paths in accordance with the wavelength of an optical signal transmitted from the optical transmission device;

a converting means including a photodiode for converting the optical signal into an electrical signal, wherein the converting means comprises a photodiode; and a displaying means including a light-emitting device for displaying an indication of the wavelength of the optical signal according to the electrical signal, wherein the selecting means selects a first one of the optical paths if the optical signal has a wavelength in the 1.3 μm band and selects a second one of the optical paths if the optical signal has a wavelength in the 1.6 μm band.

* * * * *